# (12) United States Patent
Mochizuki

(10) Patent No.: US 9,234,560 B2
(45) Date of Patent: Jan. 12, 2016

(54) DAMPING VALVE

(71) Applicant: KAYABA INDUSTRY CO., LTD., Tokyo (JP)

(72) Inventor: Takahisa Mochizuki, Gifu (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/359,618

(22) PCT Filed: Oct. 23, 2012

(86) PCT No.: PCT/JP2012/077337
§ 371 (c)(1),
(2) Date: May 21, 2014

(87) PCT Pub. No.: WO2013/077129
PCT Pub. Date: May 30, 2013

(65) Prior Publication Data
US 2014/0339034 A1    Nov. 20, 2014

(30) Foreign Application Priority Data

Nov. 22, 2011  (JP) ................................ 2011-254995

(51) Int. Cl.
*F16F 9/18*    (2006.01)
*F16F 9/34*    (2006.01)
*F16F 9/46*    (2006.01)
*F16F 9/342*   (2006.01)
(Continued)

(52) U.S. Cl.
CPC . *F16F 9/34* (2013.01); *F16F 9/185* (2013.01);
*F16F 9/466* (2013.01); *F16F 9/342* (2013.01);
*F16K 1/34* (2013.01); *F16K 1/38* (2013.01);
*F16K 27/048* (2013.01)

(58) Field of Classification Search
CPC ............. F16F 9/342; F16F 9/34; F16F 9/182;
F16F 9/466; F16K 27/048; F16K 31/04;
F16K 31/122; F16K 1/38; F16K 1/34
USPC ................................ 188/315, 322.13, 322.15
See application file for complete search history.

(56) References Cited

U.S. PATENT DOCUMENTS 5,305,860 A *  4/1994  Rotharmel et al. ........ 188/266.2
6,860,370 B2 *  3/2005  Nakadate ................... 188/282.5
(Continued)

FOREIGN PATENT DOCUMENTS

JP    H08-4818 A     1/1996
JP    H08-170680 A   7/1996
(Continued)

*Primary Examiner* — Thomas Irvin
(74) *Attorney, Agent, or Firm* — Rabin & Berdo, P.C.

(57) ABSTRACT

A damping valve includes an annular valve seat, a valve body, an actuator for driving the valve body and a valve case including a valve hole into which the valve body is slidably inserted. The valve body includes a valve main body and a shaft for transmitting a thrust force of the actuator to the valve main body. The valve main body includes a flange partitioning the interior of the valve hole into a valve seat side chamber and an opposite valve seat side chamber, a shaft portion extending from the flange and a valve head to be seated on and lifted from the valve seat. The valve seat side chamber and the opposite valve seat side chamber communicate via a communication passage and the valve seat side chamber and the flow path communicate via a throttle passage.

9 Claims, 3 Drawing Sheets

(51) Int. Cl.
*F16K 1/38* (2006.01)
*F16K 1/34* (2006.01)
*F16K 27/04* (2006.01)

(56) References Cited

U.S. PATENT DOCUMENTS

| | | | |
|---|---|---|---|
| 7,694,785 B2 * | 4/2010 | Nakadate | 188/266.5 |
| 7,997,394 B2 * | 8/2011 | Yamaguchi | 188/282.2 |
| 8,499,905 B2 * | 8/2013 | Uchiyama et al. | 188/276 |
| 8,857,580 B2 * | 10/2014 | Marking | 188/313 |
| 2006/0225976 A1 | 10/2006 | Nakadate | |
| 2010/0294605 A1 * | 11/2010 | Mochizuki | 188/297 |
| 2013/0068575 A1 * | 3/2013 | Mochizuki et al. | 188/322.13 |
| 2013/0134688 A1 * | 5/2013 | Mochizuki et al. | 280/276 |
| 2014/0124314 A1 * | 5/2014 | Mochizuki et al. | 188/322.13 |

FOREIGN PATENT DOCUMENTS

| | | |
|---|---|---|
| JP | 2005-351419 A | 12/2005 |
| JP | 2006-292092 A | 10/2006 |
| JP | 2008-014431 A | 1/2008 |

\* cited by examiner

DAMPING VALVE

TECHNICAL FIELD

The present invention relates to a damping valve and a damper.

BACKGROUND ART

A damping valve capable of adjusting a damping force is, for example, used by being built into a damper of a front fork of a two-wheel vehicle.

JP2008-14431A discloses a damper including a cylinder coupled to an outer tube, a piston slidably inserted into the cylinder to partition the interior of the cylinder into a compression side chamber and an expansion side chamber, a piston rod inserted into the cylinder and having one end coupled to an inner tube slidably inserted into the outer tube and the other end coupled to the piston, a communication path allowing communication between the compression side chamber and the expansion side chamber, and a check valve provided at an intermediate position of the communication path and permitting only a flow from the compression side chamber toward the expansion side chamber or a flow from the expansion side chamber toward the compression side chamber. A damping valve used in this damper includes an annular valve seat provided at an intermediate position of the communication path, a needle-like valve body to be seated on and lifted from the valve seat and a stepping motor fixed to the other end side of the piston rod for driving the valve body.

This damper exerts a damping force by applying resistance to the flow of hydraulic oil by a piston valve provided in the piston during expansion and exerts a damping force by applying resistance to the flow of hydraulic oil flowing out from the cylinder to a reservoir by a base valve provided at an end part of the cylinder during contraction.

Further, in this damper, the hydraulic oil flows in the communication path only during expansion or during contraction by the action of the check valve and a damping force is exerted by applying resistance to this flow of the hydraulic oil by the valve body. The damping valve also cooperates to exert a damping force during either one of the expansion and the contraction of the damper. The flow passage area of the damping valve is adjusted by driving the valve body by the motor, thereby making the damping force of the damper variable.

That is, the damping valve fulfills a damping function only during the expansion or the contraction of the damper. However, since a pair of left and right front forks normally suspend a wheel of the two-wheel vehicle, the left and right front forks can adjust damping forces at an expansion side and a contraction side as a whole by causing the valve body of the damper built in one front fork to fulfill the damping function during expansion and causing a needle valve of the damper built in the other front fork to fulfill the damping function during the contraction.

SUMMARY OF INVENTION

Since the hydraulic oil passing through the damping valve constantly flows in one direction and stably flows in the above damper, a damping force generated in the damper can be accurately adjusted.

A high pressure due to the hydraulic oil compressed by the expansion and contraction of the damper, a fluid force due to the flow of the hydraulic oil and the like act on the valve body in the damping valve. Thus, the stepping motor needs to drive the valve body while overcoming the pressure and the fluid force and it becomes difficult to accurately adjust the damping force if a torque is insufficient.

Accordingly, it is necessary to use a stepping motor capable of outputting a high torque to accurately adjust the damping force even during the expansion and contraction of the damper. However, this leads to the enlargement of the stepping motor, increases cost and reduces economic efficiency and in-vehicle mountability.

It is an object of the present invention to provide a damping valve and a damper which are low in cost and small in size and capable of accurately adjusting a damping force.

According to one aspect of the present invention, a damping valve with an annular valve seat provided at an intermediate position of a flow path allowing communication between one chamber and another chamber, a valve body capable of being seated on and lifted from the valve seat and an actuator for driving the valve body in an axial direction is provided. The damping valve includes a valve case including a valve hole into which the valve body is slidably inserted. The valve body includes a valve main body and a shaft arranged on a side of the valve main body opposite to the valve seat, projecting out of the valve hole and configured to transmit a thrust force of the actuator to the valve main body, the valve main body includes a flange held in sliding contact with the inner periphery of the valve hole to partition the interior of the valve hole into a valve seat side chamber and an opposite valve seat side chamber, a shaft portion extending from the flange and projecting out of the valve hole and a valve head provided on the tip of the shaft portion to be seated on and lifted from the valve seat, the valve seat side chamber and the opposite valve seat side chamber communicate via a communication passage, and the valve seat side chamber and the flow path communicate via a throttle passage.

Embodiments of the present invention and advantages thereof are described in detail below with reference to the accompanying drawings.

DESCRIPTION OF EMBODIMENTS

Hereinafter, an embodiment of the present invention is described based on the accompanying drawings.

Figure 1:
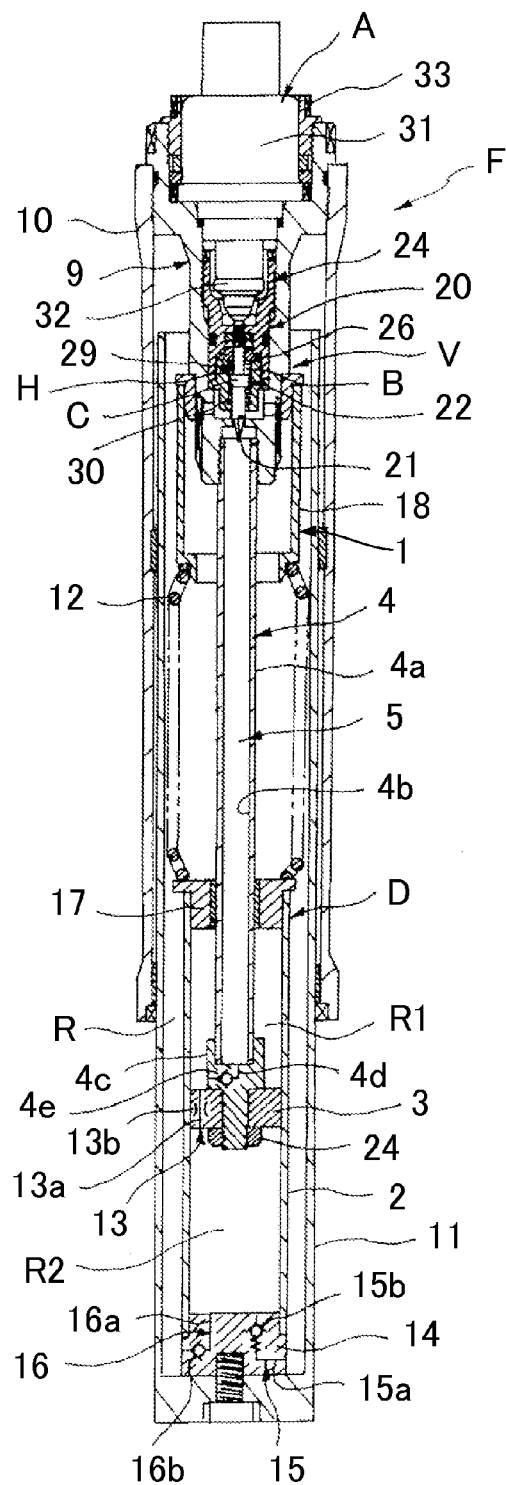
FIG. 1 is a sectional view of a damper equipped with a damping valve according to an embodiment of the present invention.

As shown in FIG. 1, a damper 1 of the present embodiment includes a cylinder 2, a piston 3 slidably inserted into the cylinder 2 to partition the interior of the cylinder 2 into a compression side chamber R2 and an expansion side chamber R1, a piston rod 4 inserted into the cylinder 2 and coupled to the piston 3, a reservoir R provided outside the cylinder 2, a flow path 5 allowing communication between the expansion side chamber R1 and the reservoir R and a damping valve V provided at an intermediate position of the flow path 5.

The damper 1 is accommodated in a front fork F composed of a body side tube 10 coupled to an unillustrated body of a saddled vehicle such as a two-wheel vehicle and an axle side tube 11 coupled to an unillustrated axle of the saddled vehicle and slidably inserted into the body side tube 10. The damper 1 is further interposed between the body side tube 10 and the axle side tube 11 with the piston rod 4 coupled to the body side tube 10 and the cylinder 2 coupled to the axle side tube 11, and accommodated in the front fork F closed by the body side tube 10 and the axle side tube 11. It should be noted that although the front fork F is described to be an inverted type front fork in which the axle side tube 11 is inserted into the body side tube 10 in the present embodiment, it may be, contrarily, an upright type front fork in which the body side tube 10 is inserted into the axle side tube 11.

A suspension spring 12 is interposed between the piston rod 4 and the cylinder 2 of the damper 1. The suspension spring 12 exerts a biasing force in a direction to separate the body side tube 10 and the axle side tube 11, i.e. in a direction to extend the front fork F via the damper 1. The body of the saddled vehicle is elastically supported by the biasing force of this suspension spring 12. Further, the reservoir R is formed in a closed space located outside the cylinder 2 and defined by the body side tube 10 and the axle side tube 11.

The damper 1 further includes a damping passage 13 which is provided in the piston 3, allows communication between the expansion side chamber R1 and the compression side chamber R2 and applies resistance to the flow of passing fluid, a compression side damping passage 15 which is provided on the lower end of the cylinder 2 and applies resistance to the flow of the fluid from the compression side chamber R2 toward the reservoir R, a suction passage 16 which permits only the flow of the fluid from the reservoir R toward the compression side chamber R2 and a bottom member 14 which includes the compression side damping passage 15 and the suction passage 16. Liquid such as hydraulic oil is filled in the expansion side chamber R1 and the compression side chamber R2 and liquid and gas are filled in the reservoir R.

The cylinder 2 is fixed to a bottom part of the axle side tube 11 in the form of a bottomed tube via the bottom member 14 fitted on the lower end. A rod guide 17 slidably and rotatably supporting the piston rod 4 is provided on the upper end of the cylinder 2. The piston rod 4 includes a tubular piston rod main body 4a with a hollow portion 4b, and a piston coupling portion 4c fixed to the lower end of the piston rod main body 4a in FIG. 1 to hold the piston 3. The upper end of the piston rod 4 in FIG. 1 is fixed to the upper end of the body side tube 10 via a housing 9 for accommodating the damping valve V. The piston coupling portion 4c includes a communication path 4d allowing communication between the hollow portion 4b and the expansion side chamber R1, and a check valve 4e provided at an intermediate position of the communication path 4d and permitting only the flow of liquid from the expansion side chamber R1 toward the hollow portion 4b. The annular piston 3 is fixed to the lower end of the piston coupling portion 4c in FIG. 1 using a guide member 24.

The suspension spring 12 is interposed between the rod guide 17 and a tubular spring bearing 18 provided on the outer periphery of the housing 9 to bias the damper 1 in an expansion direction, whereby the front fork F is also biased in the expansion direction.

The piston 3 is fixed to the lower end of the piston rod 4 in FIG. 1. The damping passage 13 provided in the piston 3 includes a passage 13a allowing communication between the expansion side chamber R1 and the compression side chamber R2 and a damping valve 13b provided at an intermediate position of the passage 13a. The damping valve 13b applies resistance to the flow of the liquid passing along the passage 13a. The damping valve 13b is a throttle valve or the like. The damping passage 13 permits flows in both directions, i.e. the flow of the liquid from the expansion side chamber R1 toward the compression side chamber R2 and the flow of the liquid from the compression side chamber R2 toward the expansion side chamber R1. It should be noted that two or more passages may be provided, a damping valve which permits only the flow of the liquid from the expansion side chamber R1 toward the compression side chamber R2 may be provided in some of the passages and a damping valve which permits only the flow of the liquid from the compression side chamber R2 toward the expansion side chamber R1 may be provided in the other passage(s).

The compression side damping passage 15 formed in the bottom member 14 includes a passage 15a which allows communication between the compression side chamber R2 and the reservoir R and a damping valve 15b which applies resistance to the flow of the passing liquid by permitting only the flow of the liquid from the compression side chamber R2 toward the reservoir R. The compression side damping passage 15 is a one-way passage which permits only the flow of the liquid from the compression side chamber R2 toward the reservoir R. On the other hand, the suction passage 16 formed in the bottom member 14 includes a passage 16a which allows communication between the compression side chamber R2 and the reservoir R and a check valve 16b which permits only the flow of the liquid from the reservoir R toward the compression side chamber R2. The suction passage 16 is a one-way passage which permits only the flow of the liquid from the reservoir R toward the compression side chamber R2 in a direction opposite to that in the compression side damping passage 15.

As described above, the damping valve V is provided at an intermediate position of the flow path 5 that allows communication between the expansion side chamber R1 and the reservoir R and permits only the passage of the liquid from the expansion side chamber R1 toward the reservoir R. The damping valve V includes the hollow housing 9 which is provided on the upper end of the piston rod 4 and the interior of which communicates with the expansion side chamber R1 as one chamber and the reservoir R as another chamber, an annular valve seat 21 which is provided in the housing 9, a valve body 22 which is accommodated in the housing 9 movably in an axial direction and movable toward and away from the valve seat 21, a valve case 20 which is provided in the housing 9 and includes a valve hole H into which the valve body 22 is slidably inserted, and an actuator A which drives the valve body 22 in the axial direction.

Figure 2:
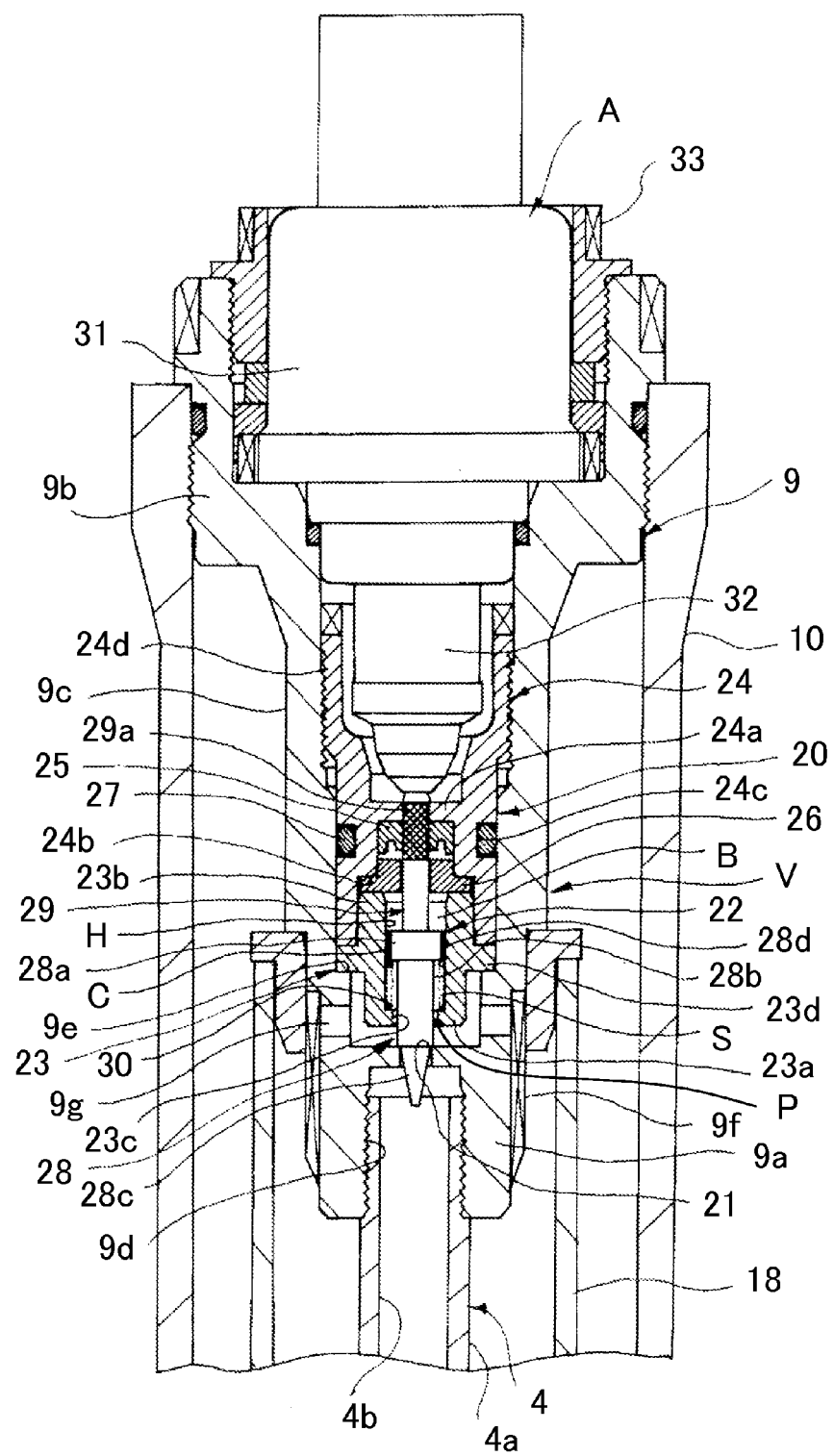
FIG. 2 is an enlarged sectional view of the damping valve according to the embodiment of the present invention.

As shown in FIG. 1 and FIG. 2, the housing 9 is tubular and includes a small-diameter portion 9a on the shown lower end, a large-diameter portion 9b on the shown upper end and a middle-diameter portion 9c located between the small-diameter portion 9a and the large-diameter portion 9b and having an outer diameter larger than that of the small-diameter portion 9a and smaller than that of the large-diameter portion 9b. The annular valve seat 21 projecting inwardly is formed at an intermediate position of the small-diameter portion 9a on the inner periphery of the housing 9. A threaded portion 9d with which the upper end of the piston rod 4 is threadably engaged is provided on a side closer to the shown lower end than the valve seat 21 in the small-diameter portion 9a. A vertical groove 9f is provided along the axial direction on the outer periphery of the small-diameter portion 9a of the housing 9. The housing 9 includes a horizontal hole 9g allowing the communication of the vertical groove 9f with a side of the interior of the small-diameter portion 9a above the valve seat 21. The inner diameter of the housing 9 is increased at a position above the opening position of the horizontal hole 9g of the small-diameter portion 9a, whereby a step portion 9e is formed inside. The inner diameter of the large-diameter portion 9b is increased at an intermediate position to be larger than that of the middle-diameter portion 9c.

If the thus configured housing 9 is mounted on the upper end of the piston rod 4, the interior of the small-diameter portion 9a of the housing 9 faces the upper end of the hollow portion 4b provided in the piston rod 4 and communicates with the expansion side chamber R1. Further, the interior of the housing 9 communicates with the reservoir R via the horizontal hole 9g.

Accordingly, the flow path 5 allows communication between the expansion side chamber R1 and the reservoir R by the hollow portion 4b and the communication path 4d provided in the piston rod 4, the interior of the small-diameter portion 9a of the housing 9 coupled to the upper end of the piston rod 4 in FIG. 1 and the horizontal hole 9g allowing the communication of the interior of the housing 9 with the reservoir R, and permits only the passage of the liquid from the expansion side chamber R1 toward the reservoir R by the check valve 4e provided at the intermediate position of the communication path 4d. Since the valve seat 21 is provided on the inner periphery of the small-diameter portion 9a and closer to the piston rod 4 than the horizontal hole 9g, it is located at an intermediate position of the flow path 5 allowing communication between the expansion side chamber R1 as the one chamber and the reservoir R as the other chamber. It should be noted that the check valve 4e setting the flow path 5 as a one-way path may be provided at a position other than in the piston coupling portion 4c. For example, the check valve 4e may be provided in the hollow portion 4b of the piston rod main body 4a or may be provided on an opening end of the hollow portion 4b on the upper end of the piston rod main body 4a in FIG. 1.

The valve case 20 includes a throttle forming member 23 in the form of a bottomed tube and the guide member 24 which is tubular and into which the throttle forming member 23 is fitted through an opening end side.

The throttle forming member 23 is in the form of a bottomed tube and includes a bottom portion 23a and a tubular portion 23b. The bottom portion 23a includes an insertion hole 23c. An annular flange 23d projecting outwardly is provided at an intermediate position of the outer periphery of the tubular portion 23b.

The guide member 24 is tubular and includes an annular bearing portion 24a projecting toward an inner peripheral side in an axial intermediate part. An annular seal member 25 is placed below the bearing portion 24a in FIG. 2. Further, a step portion 24b is provided below the bearing portion 24a of the guide member 24 in FIG. 2. An annular stopper 26 for preventing the detachment of the seal member 25 is placed on this step portion 24b. Furthermore, an annular groove 24c and a threaded portion 24d are provided on the outer periphery of the guide member 24, and a seal ring 27 is mounted in the annular groove 24c.

The valve case 20 is formed by fitting the thus configured throttle forming member 23 into the guide member 24 through the opening end side, and the valve hole H is defined between the throttle forming member 23 and the guide member 24. It should be noted that the axial length of the guide member 24 below the bearing portion 24a is so set that the stopper 26 can be sandwiched between the opening end of the throttle forming member 23 and the bearing portion 24a of the guide member 24 even if the lower end of the guide member 24 comes into contact with the flange 23d of the throttle forming member 23. If this valve case 20 is accommodated into the middle-diameter portion 9c of the housing 9 and the threaded portion 24d provided on the outer periphery of the guide member 24 is threadably engaged with a threaded portion (not denoted by a reference sign) formed on the inner periphery of the middle-diameter portion 9c, the valve case 20 is fixed to the housing 9. The flange 23d of the throttle forming member 23 is held in contact with the step portion 9e of the housing 9 and sandwiched between the step portion 9e of the housing 9 and the guide member 24. Furthermore, the tubular portion 23b of the throttle forming member 23 is press-fitted into the guide member 24. This causes the throttle forming member 23 to be fixed in the housing 9.

If the thus configured valve case 20 is fixed to the housing 9, the flange 23d comes into contact with the step portion 9e and the valve case 20 is arranged to face the flow path 5.

The valve body 22 includes a valve main body 28 and a shaft 29 arranged at an upper side of the valve main body 28 in FIG. 2 which is a side of the valve main body 28 opposite to the valve seat, slidably and rotatably supported in the valve case 20, projecting out of the valve hole H and configured to transmit a thrust force of the actuator A to the valve main body 28.

The valve main body 28 includes a flange 28a held in sliding contact with the inner periphery of the valve hole H, a shaft portion 28b extending downward from the flange 28a in FIG. 2 and projecting out of the valve hole H, and a conical valve head 28c provided on the tip of the shaft portion 28b to be seated on and lifted from the valve seat 21.

Figure 3:
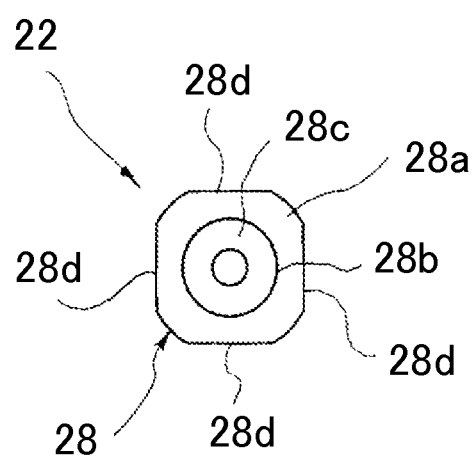
FIG. 3 is a plan view of a valve body of the damping valve according to the embodiment of the present invention.

As shown in FIG. 3, the valve main body 28 includes notches 28d formed by cutting off the outer periphery of the flange 28a at four positions. The valve main body 28 defines communication passages C between these notches 28d and the inner wall of the valve hole H, i.e. between the notches 28d and the tubular portion 23b of the throttle forming member 23. One end of the shaft 29 is united with the valve main body 28 and the other end thereof is inserted in an inner peripheral side of the bearing portion 24a and projects out of the valve hole H. It should be noted that the shape of the valve head 28c may be a shape other than the conical shape described above.

The valve body 22 is inserted into the throttle forming member 23 movably in a vertical direction of FIG. 2, which is the axial direction, while the valve head 28c is facing toward the valve seat 21 and the outer periphery of the flange 28a slides in contact with the inner periphery of the tubular portion 23b of the throttle forming member 23. The shaft portion 28b of the valve body 22 is inserted into the insertion hole 23c provided in the bottom portion 23a of the throttle forming member 23. An annular clearance is provided between this shaft portion 28b and the insertion hole 23c, and the damping valve V forms a throttle passage P in this clearance.

The valve body 22 is movably accommodated in the valve hole H formed by the throttle forming member 23 and the guide member 24 constituting the valve case 20 and capable of making a stroke movement in the axial direction in the valve hole H. The valve hole H is partitioned by the flange 28a into a valve seat side chamber S on the valve seat side which is a side lower than the flange 28a in FIG. 2 and an opposite valve seat side chamber B on a side opposite to the valve seat which is a side above the flange 28a in FIG. 2.

The valve seat side chamber S communicates with a side of the flow path 5 closer to the other chamber than the valve seat 21 via the throttle passage P and the opposite valve seat side chamber B communicates with the valve seat side chamber S via the communication passages C. Thus, a pressure in the valve seat side chamber S propagates to the opposite valve seat side chamber B. Since the communication passages C are defined by the notches 28d formed on the flange 28a of the valve main body 28, they can be provided only by applying a simple processing to the valve body 22. It should be noted that the communication passages C may have a configuration other than the above one if they allow communication between the valve seat side chamber S and the opposite valve seat side chamber B. For example, a groove allowing communication between the valve seat side chamber S and the opposite valve seat side chamber B may be provided along the axial direction on the inner periphery of the tubular portion 23b of the throttle forming member 23. In this case, the axial length of the groove is so set that the communication between the valve seat side chamber S and the opposite valve seat side chamber B is not blocked by the flange 28a even if the valve body 22 makes a stroke movement in the valve hole H.

Furthermore, a coil spring 30 as an elastic body is interposed between the flange 28a and the bottom portion 23a of the throttle forming member 23 constituting the valve case 20. The valve body 22 is biased in a direction away from the valve seat 21 by this coil spring 30. It should be noted that an elastic body capable of exerting a biasing force such as a disc spring, a wave washer or rubber may be used besides the coil spring 30.

If the valve body 22 makes a stroke movement in the valve hole H, the shaft 29 also makes a stroke movement in the axial direction relative to the bearing portion 24a. At this time, if a range where the shaft 29 is held in sliding contact with the inner periphery of the bearing portion 24a provided on the valve case 20 is a slide contact portion 29a (cross-hatched part in FIG. 2), the cross-sectional area of the slide contact portion 29a is smaller than that of the flange 28a. Here, the cross-sectional area is the area of a cross-section cut in a transverse direction (lateral direction in FIG. 2) perpendicular to the axial direction.

Since the outer peripheral shape of the shaft 29 and the outer peripheral shape of the flange 28a are both circular if the notches 28d are ignored, the outer diameter of the shaft 29 is smaller than that of the flange 28a. It should be noted that the outer peripheral shape of the shaft 29 and the outer peripheral shape of the flange 28a are not limited to circular shapes. Further, although the outer diameter of the shaft 29 is equal over the entire length in the axial direction and the shaft 29 has a cylindrical shape, the shaft 29 may be so shaped that the outer diameter varies in the axial direction. That is, the cross-sectional area may not be constant over the entire length in the axial direction.

The actuator A includes an actuator main body 31 and a movable portion 32 movable in the axial direction relative to the actuator main body 31. The actuator main body 31 includes, for example, a rotary motor and a motion converting mechanism composed of a linearly moving member for converting a rotational motion of a rotating member coupled to a rotor of the motor into a linear motion in the axial direction. The motion converting mechanism is, for example, a feed screw mechanism, a rack and a pinion or the like. Further, the actuator A may be a linear motor, a solenoid or the like.

By accommodating the actuator main body 31 into the large-diameter portion 9b of the housing 9 and threadably fitting a ring nut 33 on the inner periphery of the opening end of the large-diameter portion 9b of the housing 9 with the movable portion 32 facing toward the valve case 20, the actuator main body 31 is sandwiched between the ring nut 33 and the housing 9 and fixed in the large-diameter portion 9b of the housing 9.

Even if the actuator main body 31 is fixed to the housing 9 as described above, the movable portion 32 can move in the axial direction in the housing 9 since the movable portion 32 is not fixed to the housing 9. Further, the tip of the movable portion 32 is held in contact with the other end of the shaft 29. If the actuator A applies a thrust force to move the movable portion 32 toward the valve body 22, this thrust force is transmitted to the valve main body 28 via the shaft 29, whereby the valve body 22 can be driven in a direction toward the valve seat 21. Furthermore, since the coil spring 30 is provided as an elastic body for biasing the valve body 22 in the direction away from the valve seat 21, the movable portion 32 and the shaft 29 can be kept in contact and the thrust force of the actuator A can be transmitted to the valve body 22 even if the movable portion 32 and the shaft 29 are not fixedly coupled. It should be noted that the shaft 29 and the valve main body 28 may be separate components which are independent of each other. Further, if the shaft 29 and the valve main body 28 are united and the shaft 29 is fixedly coupled to the movable portion 32, the valve body 22 can be moved back and forth relative to the valve seat 21 by being driven in the axial direction only by the actuator A without using any elastic body for biasing the valve body 22. In this case, the elastic body may be omitted.

If the valve body 22 is pushed down toward the valve seat 21 by driving the actuator A, the valve head 28c of the valve body 22 is seated on the valve seat 21 to block the flow path 5. If the movable portion 32 is pushed up toward the actuator main body 31 by driving the actuator A in this state, the valve body 22 is pushed up by the coil spring 30. This causes the valve body 22 to move in the direction away from the valve seat 21, thereby forming a clearance between the valve head 28c and the valve seat 21 and opening the flow path 5. That is, by driving the actuator A, the valve body 22 can be moved back and forth relative to the valve seat 21 and the flow passage area of the flow path 5 can be varied. The flow passage area of the flow path 5 can be changed by a positional relationship between the valve body 22 and the valve seat 21. If the valve body 22 is moved to a most distant position from the valve seat 21, the flow passage area of the flow path 5 is maximized. On the other hand, if the valve body 22 is seated on the valve seat 21, i.e. the valve head 28c is brought into contact with the valve seat 21, the flow path 5 is completely blocked and the flow passage area becomes 0. If the flow path 5 is in an open state, the expansion side chamber R1 and the reservoir R communicate. If the damper 1 is expanded in this state, the liquid passes along the flow path 5 and is discharged to the reservoir R and resistance is applied to the flow of the liquid according to the flow passage area of the flow path 5.

Next, a procedure of assembling each member of the damping valve V is described.

The valve body 22 is inserted into the throttle forming member 23 together with the coil spring 30, the stopper 26 and the seal member 25 are mounted on the shaft 29 and the throttle forming member 23 is press-fitted into the guide member 24 through the opening end side. Then, the valve case 20 and the valve body 22 are assembled and this assembly is threadably engaged with the housing 9. Further, the actuator A is fixed to the housing 9 by the ring nut 33. Since the valve case 20 and the valve body 22 are formed into a cartridge in this way, assembling into the damper 1 is facilitated and a damping force characteristic can be easily changed only by exchanging a cartridge by preparing a plurality of cartridges having different aperture diameters of the insertion hole 23c and different shapes of the valve head 28c of the valve body 22. It should be noted that if the throttle forming member 23 is not press-fitted into the guide member 24, the valve body 22 and the throttle forming member 23 can be independently exchanged and the damping force characteristic can be changed only by exchanging the valve body 22 or the throttle forming member 23.

It should be noted that since the valve main body 28 and the shaft 29 constituting the valve body 22 are united, it is possible to assemble the stopper 26 and the seal member 25 on the shaft 29 in advance. Since this makes it easier to align the stopper 26 and the seal member 25 with respect to the guide member 24, assembling of the throttle forming member 23 into the guide member 24 becomes very simple and it can be prevented that the shaft 29 comes off after the valve body 22 and the valve case 20 are formed into a cartridge.

If the throttle forming member 23 and the guide member 24 are configured to be fixedly fastened by press-fitting, threadable engagement or the like, the valve case 20 and the valve body 22 are formed into a cartridge and the above advantage can be obtained even if a configuration other than the above is adopted. Further, the valve case 20 and the housing 9 may be configured by the same component.

Next, the operations of the damper 1 and the damping valve V are described.

During the expansion of the damper 1 in which the piston 3 moves upward relative to the cylinder 2 in FIG. 1, resistance is applied to the flow of the liquid moving from the expansion side chamber R1 compressed by the piston 3 to the compression side chamber R2 in the damping passage 13 and resistance is applied to the flow of the liquid from the expansion side chamber R1 toward the reservoir R by the damping valve V. That is, the damper 1 exerts an expansion side damping force by the damping passage 13 and the damping valve V during expansion. It should be noted that the liquid is supplied from the reservoir R to the compression side chamber R2 enlarged during expansion via the suction passage 16 provided in the bottom member 14, thereby compensating for a volumetric change in the cylinder 2 caused by an outward movement of the piston rod 4 from the cylinder 2 associated with the expansion of the damper 1.

On the contrary, during the contraction of the damper 1 in which the piston 3 moves downward relative to the cylinder 2 in FIG. 1, resistance is applied to the flow of the liquid moving from the compression side chamber R2 compressed by the piston 3 to the expansion side chamber R1 in the damping passage 13. Further, the liquid corresponding to a volume reduction in the cylinder 2 caused by the entrance of the piston rod 4 into the cylinder 2 is discharged to the reservoir R via the compression side damping passage 15 of the bottom member 14, thereby compensating for a volumetric change in the cylinder 2. At this time, resistance is applied to the flow of the liquid also in the compression side damping passage 15. Thus, the damper 1 exerts a compression side damping force in the damping passage 13 and the compression side damping passage 15 during contraction. Since no liquid flows in the flow path 5, the damping valve V is not involved in the generation of the compression side damping force.

Since the damping valve V can vary the flow passage area of the flow path 5 by driving the valve body 22 as described above, this damper 1 can adjust the expansion side damping force during expansion.

When the damper 1 expands and the valve body 22 is separated from the valve seat 21 to open the flow path 5, a high pressure from the expansion side chamber R1 and a fluid force due to the flow of the liquid flowing in the flow path 5 act on the valve body 22. Further, when the damper 1 contracts, the axle side tube 11 enters the body side tube 10, wherefore the volume of the reservoir R decreases, a pressure in the reservoir R increases and this pressure acts on the valve body 22.

These pressure and fluid force propagate to the valve seat side chamber S in the valve hole H and also to the opposite valve seat side chamber B via the communication passages C. The pressure propagated to the valve seat side chamber S acts to push the valve body 22 upward in FIG. 2, i.e. to push up the valve body 22 in the direction away from the valve seat 21. The magnitude of the force acting on the valve body 22 is a value obtained by multiplying the cross-sectional area of the flange 28a of the valve body 22 by the pressure propagated to the valve seat side chamber S. On the other hand, the pressure propagated to the opposite valve seat side chamber B acts to push the valve body 22 downward in FIG. 2, i.e. to push down the valve body 22 in the direction toward the valve seat 21. The magnitude of the force acting on the valve body 22 is a value obtained by multiplying a value obtained by subtracting the cross-sectional area of the slide contact portion 29a of the shaft 29 from the cross-sectional area of the flange 28a of the valve body 22 by the pressure propagated to the opposite valve seat side chamber B.

Since the pressure acts on the valve body 22 not only from the valve seat side chamber S, but also from the opposite valve seat side chamber B in this way, a force having a value obtained by multiplying the cross-sectional area of the slide contact portion 29a of the shaft 29 by the above pressure acts on the valve body 22 in the direction away from the valve seat 21 if these pressures are balanced.

This makes the force for pressing the valve body 22 in the direction away from the valve seat 21 by the pressure acting on the valve body 22 smaller as compared with conventional damping valves.

Further, since the valve seat side chamber S and the flow path 5 communicate via the throttle passage P, the flow of the liquid passing along the flow path 5 does not directly collide with the flange 28a in the valve seat side chamber S and the fluid force acting to push the valve body 22 upward in FIG. 2 by the flow of the liquid acts only on the valve head 28c. Thus, it can be prevented that the fluid force acts on the entire valve body as in conventional damping valves. Similarly, the fluid force acting on the valve body 22 when the liquid passes along the flow path 5 is also reduced as compared with conventional damping valves.

According to the above embodiment, the following effects are exhibited.

In the damping valve V, the pressure and the fluid force acting in the direction to push up the valve body 22 can be reduced when the valve body 22 is driven in the direction toward the valve seat 21 to reduce the flow passage area in the flow path 5. Thus, a force for suppressing the approach of the valve body 22 toward the valve seat 21 becomes smaller and the damping force can be accurately adjusted even if the thrust force of the actuator A is small.

This can reduce an output required of the actuator A and enables an accurate damping force adjustment while avoiding the enlargement of the actuator A. Further, the deterioration of in-vehicle mountability can be prevented since the small-size and low-cost actuator A can be used.

That is, the damping valve V is low in cost and small in size and can accurately adjust the damping force. Since the damper 1 of the present embodiment enables the miniaturization of the actuator A, the deterioration of in-vehicle mountability can be prevented in addition to the above effects.

It should be noted that although the valve seat side chamber S is defined by the insertion hole 23c provided in the valve case 20 and the shaft portion 28b in the valve body 22, any structure communicating with the flow path 5 via the throttle passage P may be adopted and, for example, a separate throttle passage may be provided in the bottom portion 23a or the tubular portion 23b of the throttle forming member 23. In this case, the shaft portion 28b is slidably inserted into the insertion hole 23c. However, since the insertion hole 23c penetrating through the valve body 22 is originally necessary for the throttle forming member 23, the number of processing steps can be reduced and processing cost can be reduced by that much as compared with the case where the throttle passage P is separately provided in the valve case 20 if the throttle passage P is provided between the insertion hole 23c and the shaft portion 28b.

Further, since the damping valve V includes the housing 9 for removably accommodating the valve case 20 and the actuator A inside, the valve case 20 and the actuator A can be easily exchanged, the damping force characteristic can be changed and maintenance can be performed with ease.

Furthermore, the valve case 20 includes the throttle forming member 23 in the form of a bottomed tube including the bottom portion 23a formed with the insertion hole 23c and the tubular portion 23b held in sliding contact with the outer periphery of the flange 28a, and the tubular guide member 24 which includes the bearing portion 24a for rotatably supporting the shaft 29 inside and into which the throttle forming member 23 is press-fitted through the opening end side, and the valve hole H is formed by the throttle forming member 23 and the guide member 24. Since this enables the valve case 20 and the valve body 22 to be assembled into a cartridge, the assembling of the damping valve V becomes easier. Further, the damping force characteristic can be easily changed only by changing the cartridge composed of the valve case 20 and the valve body 22.

Furthermore, since the damping valve V includes the elastic body, which biases the valve body 22 in the direction away from the valve seat 21, between the flange 28a and the bottom portion 23a of the throttle forming member 23, it is not necessary to fixedly couple the actuator A and the valve body 22. Thus, the actuator A and the valve body 22 need not be aligned with high precision, processing cost can be reduced and the damping force can be accurately adjusted without requiring strict positioning of the damping valve V.

Furthermore, in the damping valve V, the annular seal member 25 held in sliding contact with the outer periphery of the slide contact portion 29a of the shaft 29 is placed on the valve hole H side of the bearing portion 24a of the guide member 24, and the annular stopper 26 for preventing the detachment of the seal member 25 is sandwiched between the bearing portion 24a of the guide member 24 and the throttle forming member 23. Since this causes the seal member 25 together with the valve body 22 to be assembled with the valve case 20 into a cartridge, the assembling of the damping valve V can be further simplified.

Furthermore, in the above embodiment, the flow path 5 permits the passage of the fluid only during the expansion of the damper 1 and the damping valve V functions as a damping force generating element for generating the expansion side damping force of the damper 1. Instead of this, the flow path 5 may permit the passage of the fluid only during the contraction of the damper 1 and function as a damping force generating element for generating the compression side damping force of the damper 1. In this case, if the compression side chamber R2 is caused to communicate with the hollow portion 4b instead of the expansion side chamber R1 by the communication path 4d provided in the piston coupling portion 4c, the damping valve V can adjust the compression side damping force. That is, the damping valve V may use either one of the expansion side chamber R1 and the compression side chamber R2 as one chamber. Further, the reservoir R may be one chamber and either one of the expansion side chamber R1 and the compression side chamber R2 may be the other chamber. Furthermore, the one and the other chambers may be respectively the expansion side chamber R1 and the compression side chamber R2 and the damping force may be adjusted during both the expansion and contraction of the damper 1.

Furthermore, since the valve body 22 and the actuator A are arranged very close to each other in the damper 1, the valve body 22 can be driven without using a long control rod or the like and the number of components can be reduced. In addition, since the valve body 22 can be more accurately driven, damping force controllability is improved. Further, power feeding to the actuator A from outside becomes easier, whereby convenience and general versatility can be improved.

Furthermore, the damper 1 may be configured to exert the damping force only during expansion if the damping valve V exerts the damping force during the expansion of the damper 1 and may be configured to exert the damping force only during contraction if the damping valve V exerts the damping force during the contraction of the damper 1.

The embodiments of the present invention described above are merely illustration of some application examples of the present invention and not of the nature to limit the technical scope of the present invention to the specific constructions of the above embodiments.

The present application claims a priority based on Japanese Patent Application No. 2011-254995 filed with the Japan Patent Office on Nov. 22, 2011, all the contents of which are hereby incorporated by reference.

The invention claimed is:

1. A damping valve with an annular valve seat provided at an intermediate position of a flow path allowing communication between one chamber and another chamber, a valve body capable of being seated on and lifted from the valve seat and an actuator for driving the valve body in an axial direction, comprising:
    a valve case including a valve hole into which the valve body is slidably inserted, wherein:
    the valve body includes a valve main body and a shaft arranged on a side of the valve main body opposite to the valve seat, projecting out of the valve hole and configured to transmit a thrust force of the actuator to the valve main body;
    the valve main body includes a flange held in sliding contact with the inner periphery of the valve hole to partition the interior of the valve hole into a valve seat side chamber and an opposite valve seat side chamber, a shaft portion extending from the flange and projecting out of the valve hole and a valve head provided on a tip of the shaft portion to be seated on and lifted from the valve seat such that a damping passage is formed between the valve head and the valve seat;
    the valve seat side chamber and the opposite valve seat side chamber communicate via a communication passage; and
    the valve seat side chamber and the flow path communicate via a throttle passage provided independently of the damping passage.

2. The damping valve according to claim 1, wherein:
    the cross-sectional area of a slide contact portion, which is a part of the shaft held in sliding contact with the valve case, is smaller than the cross-sectional area of the flange.

3. The damping valve according to claim 1, wherein:
    the valve case includes an insertion hole which communicates with the valve hole and faces the valve seat and into which the shaft portion is inserted; and
    the throttle passage is an annular clearance formed between the insertion hole and the shaft portion.

4. The damping valve according to claim 1, further comprising:
a housing in which the valve case and the actuator are removably accommodated and which includes the valve seat.

5. The damping valve according to claim 1, wherein:
the valve main body and the shaft are united.

6. A damping valve with an annular valve seat provided at an intermediate position of a flow path allowing communication between one chamber and another chamber, a valve body capable of being seated on and lifted from the valve seat and an actuator for driving the valve body in an axial direction, comprising:
a valve case including a valve hole into which the valve body is slidably inserted, wherein:
the valve body includes a valve main body and a shaft arranged on a side of the valve main body opposite to the valve seat, projecting out of the valve hole and configured to transmit a thrust force of the actuator to the valve main body;
the valve main body includes a flange held in sliding contact with the inner periphery of the valve hole to partition the interior of the valve hole into a valve seat side chamber and an opposite valve seat side chamber, a shaft portion extending from the flange and projecting out of the valve hole and a valve head provided on a tip of the shaft portion to be seated on and lifted from the valve seat;
the valve seat side chamber and the opposite valve seat side chamber communicate via a communication passage; and
the valve seat side chamber and the flow path communicate via a throttle passage, wherein:
the valve case includes an insertion hole which communicates with the valve hole and faces the valve seat and into which the shaft portion is inserted;
the throttle passage is an annular clearance formed between the insertion hole and the shaft portion;
the valve case includes a throttle forming member which is in the form of a bottomed tube including a bottom portion formed with the insertion hole and a tubular portion held in sliding contact with the outer periphery of the flange, and a tubular guide member which includes a bearing portion for rotatably supporting the shaft inside and into which the throttle forming member is press-fitted through an opening end side; and
the valve hole is formed by the throttle forming member and the guide member.

7. The damping valve according to claim 6, further comprising:
an elastic body provided between the flange and the bottom portion for biasing the valve body in a direction away from the valve seat.

8. The damping valve according to claim 6, further comprising:
an annular seal member placed on a valve hole side of the bearing portion and held in sliding contact with the outer periphery of a slide contact portion, which is a part of the shaft held in sliding contact with the valve case; and
an annular stopper sandwiched between the bearing portion and the throttle forming member for preventing the detachment of the seal member.

9. A damper with a cylinder, a piston slidably inserted into the cylinder to partition the interior of the cylinder into a compression side chamber and an expansion side chamber, a piston rod inserted into the cylinder and coupled to the piston, a reservoir provided outside the cylinder, a flow path allowing one of the compression side chamber and the expansion side chamber to communicate with the reservoir, an annular valve seat provided at an intermediate position of the flow path, a valve body capable of being seated on and lifted from the valve seat, and an actuator for driving the valve body in an axial direction, comprising:
a valve case including a valve hole into which the valve body is slidably inserted, wherein:
the valve body includes a valve main body and a shaft arranged on a side of the valve main body opposite to the valve seat, slidably and rotatably supported in the valve case, projecting out of the valve hole and configured to transmit a thrust force of the actuator to the valve main body;
the valve main body includes a flange held in sliding contact with the inner periphery of the valve hole to partition the interior of the valve hole into a valve seat side chamber and an opposite valve seat side chamber, a shaft portion extending from the flange and projecting out of the valve hole and a valve head provided on a tip of the shaft portion to be seated on and lifted from the valve seat;
the valve seat side chamber and the opposite valve seat side chamber communicate via a communication passage;
the valve seat side chamber and the flow path communicate via a throttle passage; and
the cross-sectional area of a slide contact portion, which is a part of the shaft held in sliding contact with the valve case, is smaller than the cross-sectional area of the flange.

* * * * *